*INVENTOR.*
DALE G. HOLINBECK

May 25, 1965 D. G. HOLINBECK 3,185,093

HIGH FREQUENCY IMMUNE SQUIB

Filed Feb. 8, 1962 11 Sheets-Sheet 2

*INVENTOR.*
DALE G. HOLINBECK

May 25, 1965 D. G. HOLINBECK 3,185,093

HIGH FREQUENCY IMMUNE SQUIB

Filed Feb. 8, 1962 11 Sheets-Sheet 3

INVENTOR.
DALE G. HOLINBECK

INVENTOR.
DALE G. HOLINBECK

*INVENTOR.*
DALE G. HOLINBECK

INVENTOR.
DALE G. HOLINBECK

*INVENTOR.*
DALE G. HOLINBECK

INVENTOR.
DALE G. HOLINBECK

INVENTOR.
DALE G. HOLINBECK

INVENTOR.
DALE G. HOLINBECK
BY [signature]
ATTORNEY

HIGH FREQUENCY IMMUNE SQUIB

Filed Feb. 8, 1962

INVENTOR.
DALE G. HOLINBECK
BY John M. Diehl
ATTORNEY

United States Patent Office 3,185,093
Patented May 25, 1965

3,185,093

HIGH FREQUENCY IMMUNE SQUIB

Dale G. Holinbeck, Madison, Wis., assignor to Bjorksten Research Laboratories for Industry, Inc., Madison, Wis., a corporation of Wisconsin Filed Feb. 8, 1962, Ser. No. 171,931
4 Claims. (Cl. 102—28)

This invention relates to electric ignition mechanisms for explosive charges (hereinafter called squibs), incendiary devices, photographic flash lamps and other similar devices, and more particularly relates to an ignition device in combination with circuitry which protects the device from being accidentally actuated by a current being inadvertently induced in the ignition circuit.

This application is a continuation-in-part of Serial No. 117,581, now Patent No. 3,148,619 of same entitlement and inventorship filed June 16, 1961.

Electrically detonated armaments such as rockets, missiles, and recoilless rifles, demolition charges such as dynamite, and incendiary charges, and light generating devices such as photographic flash lamps are vulnerable to accidental actuation by high-intensity environmental radiation such as by radio and radar beams which cause electric currents to be induced in actuating circuits of the devices. The danger of accidental actuation is particularly acute in the vicinity of radar and radio transmitters, and stringent precautions must be taken to insure safe operation and handling of squib ignited armaments in the vicinity of radio frequency transmitters.

The device of this invention prevents currents above frequencies of such as about 10 kilocycles per second from passing through the firing circuit of an ignition device and therefore virtually eliminates the possibility of accidental firing of a squib or igniter by high frequency environmental radiation. It is particularly effective as a means for protecting squibs located in the vicinity of transmitters broadcasting at radar or radio frequencies, such as on aircraft carriers or the like.

The danger of accidental detonation of armaments by environmental radiation is widely recognized and numerous devices have been designed to prevent accidental firing of armaments. Simple protective devices heretofore known do not provide the desired degree of positive protection. The hereinafter described invention differs from such devices by totally enclosing the squib circuit within a shield of adequate thickness so as to provide positive protection from high frequencies by electromagnetic shielding. The provision of a closed shield does not enable insulated wires to be passed through the shield because this insulation itself would constitute a break in the electromagnetic shield that would enable high frequency radiation to penetrate the shield and resonate in the interior of the shield. Intentional firing of the squib is accomplished by magnetic coupling of low frequency direct current or by direct current pulse, the shield being relatively penetrable to low frequency energy transfer.

The shield of this invention is an electromagnetic (magnetic) shield as distinct from an electrostatic shield. Magnetic shielding is defined in § 14.1*j*, p. 14–18 of Electronic Designers' Handbook by Landee, R. W., Davis, D. C. and Albrecht, H. P., McGraw-Hill, 1957. In electrostatic shielding, neither the degree of conductivity nor the thickness of the shield is critical. Electrostatic shielding is complete when a conducting sheet of at least a few molecules is provided and such a shield can be fairly effective even though its surface is not continuous, as in the case of a wire mesh.

In contrast, the degree of electromagnetic shielding provided by a shield depends on the frequency of the electromagnetic radiation and the thickness, electrical conductivity and magnetic permeability of the shielding material. The effectiveness of an electromagnetic shield at any given frequency can be described in terms of "skin depth" as discussed in standard texts on the subject, and defined as the thickness of metal required for induced current of a given frequency to be attenuated to a value of $1/e$ of its value at the surface of the metal. An electromagnetic shield will always constitute an electrostatic shield but the reverse is not true. By providing a complete shielding of the secondary circuit, the squib is virtually isolated from radiation above a limiting frequency, the limiting frequency being dependent on the physical dimensions and electrical properties of the shield. Thus, a current in a squib or igniter is provided by magnetically coupling the squib or igniter to a low frequency alternating current or a direct current primary circuit, and providing a closed circuit (shorted turn) shield between the primary and secondary circuits.

The provision of a completely closed unperforated shield is preferred, and for complete protection under all circumstances is critically necessary, because high frequency radiation of sufficient intensity can enter a chamber or cavity through a minute aperture and be greatly amplified by resonating therein. Thus, an opening in a shield for passing a wire conductor or the like is potentially dangerous as a means for enabling high frequency radiation to enter the shielded enclosure and by resonance phenomena induce a sufficient current in a conductor within the chamber to actuate the squib or igniter. The demonstration of such resonance effects is well known and is presented in texts on physical science.

It may be necessary to provide openings in an electromagnetic shield in a device of this invention for purposes of enabling light to be emitted or for other purposes, but it is not within the scope of this invention to pass a conductor through such an opening. A conductor passed in the manner provides an optimum path for high frequency currents to enter the enclosure, and this is true if the conductor is insulated because the construction of the opening in the shield is essentially that of a co-axial cable.

It is an object of this invention to provide a firing squib or igniter and protective device therefor wherein the squib or igniter is protected from accidental actuation by environmental electromagnetic radiation.

It is another object of this invention to provide an integral squib and protector therefor which may be used in substantially any application in which a firing squib is now used.

It is another object of this invention to provide a rugged circuit element which is unaffected by impact acceleration, temperature or corrosive conditions.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
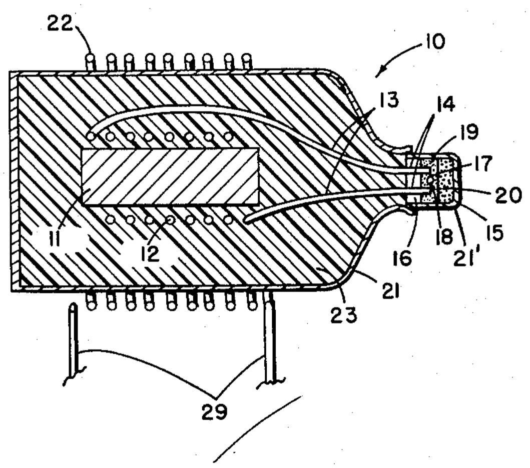
FIGURE 1 is a cross-sectional elevation of one embodiment of the device of this invention.
Figure 2:
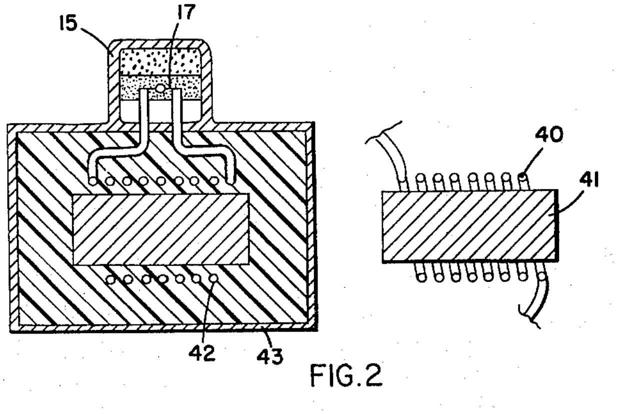
FIGURE 2 is a cross-sectional elevation of another embodiment of this invention wherein a primary winding is remotely disposed from the secondary winding.

In FIGURE 1 is shown device 10 comprising core 11 of ferromagnetic material such as iron with secondary circuit windings 12 wound thereon. Lead wires 13 connect the ends of windings 12 to posts 14 of squib 15. Posts 14 of squib 15 pass through insulating plug 16 and are connected to the ends of bridgewire 17. A thermally ignitable charge of material 18 is disposed about bridgewire 17. Booster charge 19 is provided immediately adjacent material 18, and main charge 20 fills the remaining volume of squib 15. Charges 19 and 20 are explosive materials such as black powder or the like. The construction of squib 15 is conventional and comprises no part of this invention. Shield 21 is a closed conductive container which encloses windings 12 and lead wires 13 and the portion of posts 14 exterior to squib 15. Container 21' enclosing the ignitable powder of squib 15 is, in a preferred embodiment of this invention, conductive, and is tightly and hermetically sealed to shield 21 so that a continuous conductive enclosure is provided by the two members. Primary circuit windings 22 are wound on the outside of shield 21. Secondary circuit insulated winding 12 and shield 21 are separated by di-electric material 23. Material 23 may comprise any dielectric and preferably comprises synthetic resin in which core 11, windings 12 thereon, and lead wires 13 can be potted in operable manner. In a preferred embodiment of this invention, container 21' and shield 21 comprises a non-magnetic metal or alloy such as copper, tin, zinc, aluminum or magnesium or may comprise paramagnetic or ferromagnetic material such as steel, nickel, or other operable conductive material, including non-metallic materials such as carbon, graphite, etc.

A squib as used herein is conventional in construction and may be for example a military version which is 0.437 inch long and 0.271 inch in diameter. Device 10 is preferably not more than three inches in length and 1½ inches in diameter. As is apparent, device 10 may be made much smaller in dimension than the preferred limiting size. In operation, electrical current flowing from a supply source such as a battery-powered or generator-powered source flows through conductors 29 and primary circuit coil 22. A changing magnetic field is created by a change in current in the coil so that an initial current pulse increasing in amperage generates an expanding magnetic field which cuts across secondary circuit windings 12 and induces a voltage difference therein. Current flows in winding 12 and leads 13 through bridgewire 17 to ignite initiator charge 18 and detonate the squib. Current flow of the order of a few tenths of an ampere in bridgewire 17 will be sufficient to ignite charge 18 when the bridgewire is of such composition and dimension as to become sufficiently heated to ignite the explosive charge by the current flow. Corrosion-resistant material such as platinum-iridium alloy is preferred for the bridgewire. The initial current flow in winding 22 desirably should be sufficient to operably ignite squib 15 so as to enable either direct or alternating current to be used in the energizing circuit. Primary circuit potentials of 28 volts are commonly provided in aircraft armament systems, and it is desirable in such systems to provide a safety factor so that a squib will fire when lesser potentials such as 10 or 12 volts or less are developed in the primary circuit. In the devices shown herein, such as in device 10 of FIGURE 1, voltages may be stepped up or stepped down as desired by varying the ratio of turns in the windings of primary and secondary circuits, as will be apparent. Also, the duration of current flow in the secondary circuit when a step-wave of direct current is supplied to the primary circuit may be varied by the ratio and number of turns in the windings of primary and secondary circuits.

The windings of the primary and the secondary circuits in device 10 of FIGURE 1 are disposed in superimposed concentric relation, but other arrangements which provide sufficient changing magnetic flux through the winding of the secondary circuit to induce the energy necessary to ignite squib 15 may also be utilized. Shield 21 comprises a container of conductive material which encloses the secondary circuit elements. The provision of shield 21 operably prevents high-frequency current of a magnitude sufficient to fire squib 15 from being induced in secondary winding 12 and leads 13. Energy transfer from spurious radiation of radio or radar frequencies between the primary and secondary circuits is minimized by the interdisposition of the metal shield between the primary and secondary windings. High frequency currents which are induced in the primary circuit are expended as eddy currents in the shield in a surface layer adjacent the outermost surface of the shield. The eddy current flow is expended by energy degradation into heat which is readily dissipated by conduction and radiation from the shield. Energy transfer from currents of lesser frequency is operably provided in the firing circuit for igniting the squib, because the thickness of the shield is much less than the skin thickness for current of that frequency. Skin thickness $\gamma$ is that linear dimension transverse to current flow in which current or field penetrating into a conductor many times $\gamma$ in thickness will decrease to $1/e$ times its magnitude at the surface of the conductor wherein $e$ is the base of natural logarithms. The skin thickness in meters is given as $$\gamma=\sqrt{\frac{1}{\pi f \mu \sigma}}$$

where $f$=frequency in c.p.s., $\mu$=permeability of the metal in $h/m$, $\sigma$=conductivity of the metal in mhos/$m$. The factors to be considered in determining optimum shield thickness are the frequencies of the current to be passed and of the current to be suppressed, as well as the permeability and conductivity of the metal or other conductive material which is used for the shield. It will be apparent from the formulas presented that the amplitude of any given high-frequency current in the primary circuit may be suppressed in the secondary circuit to any degree desired virtually to total elimination by proper selection of shield composition and thickness. Conversely, the amplitude of any given low-frequency current can be passed by the shield virtually without attenuation if desired. Although other factors influence the efficiency of the energy transfer by inductive coupling herein, the shield is the primary frequency-dependent variable. Thus, a relatively narrow cut-off frequency range is provided by a device of this invention, whereas a much broader cut-off frequency range is provided by an unshielded device. By proper selection of a shield any given high frequency current in the primary circuit may be quenched or attenuated in any degree for safety in the inductively coupled secondary circuit without materially attenuating energy transfer by lower frequency currents. Thus, any safety factor may be provided as desired to insure that high frequency currents of operable amplitude are not induced in the secondary circuit.

The necessary embodiment common to all of the devices of this invention is that a continuous shield is provided for the secondary circuit elements including the secondary circuit windings, the squib, and the lead wires therebetween which operably shield and enclose such members from the effects of high frequency electro-magnetic radiation in the immediate environment of the shield.

Figure 3:
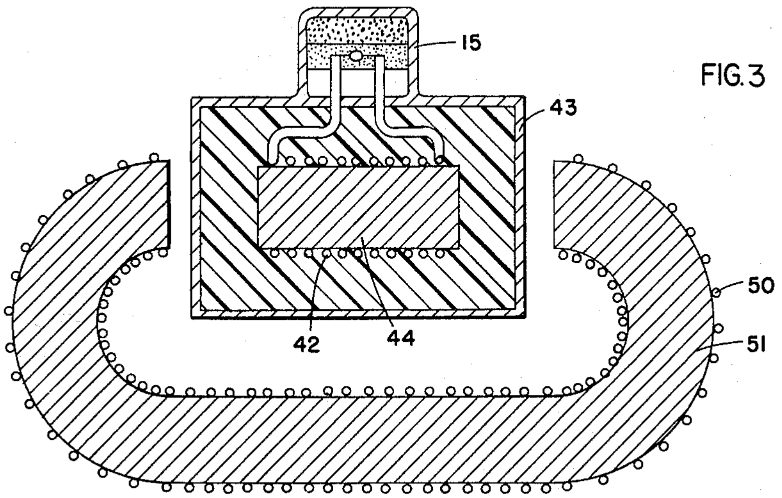
FIGURE 3 is a cross-sectional elevation of another embodiment of the device of FIGURE 2, but wherein the primary circuit is configurated to provide magnetic flux of high density linking the secondary winding.

In FIGURE 3 is shown another embodiment of the invention wherein primary circuit windings 40 on core 41 are remotely disposed from secondary circuit windings 42 and conductive shield 43. Shield 43 comprises a sealed enclosure which is electrically connected to the enclosure of squib 15. The enclosure of squib device 15 is electrically conductive. The device shown in FIGURE 3 operates in substantially identical manner to the device of FIGURE 1 by a relatively low frequency energizing current flowing in primary circuit windings 40 producing a changing magnetic flux which penetrates shield 43 and secondary windings 42 and induces a voltage in the secondary circuit across the bridgewire of the squib sufficient to detonate the squib. The initial pulse of current which flows in the secondary circuit is sufficient to ignite the squib so that the device is operable with either direct current or alternating current, the magnitude of the voltage in the secondary circuit being a function of the rate of change of current flow in the primary circuit. The more nearly instantaneous the change in the primary circuit, the greater is the voltage induced in secondary circuit and across bridgewire 17 in squib 15. It is to be understood that the disposition of primary circuit windings and secondary circuit windings in the devices of this invention are not critical to the invention, but are material only to the production of operable energy in the secondary circuit to detonate the squib.

Figure 4:
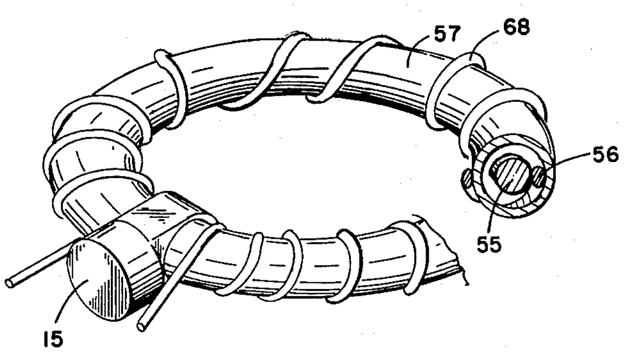
FIGURE 4 is a cut away of a perspective view of a coaxially wound toroidally configurated device of this invention.

In FIGURE 4 is shown another embodiment of the invention wherein primary circuit windings 50 are wound on horseshoe-configured core 51. Conducting shield 43 enclosing secondary circuit windings 42 on core 44 is disposed between the opposed end extremities of core 51. Squib device 15 is sealed to enclosure 43 and electrical connection is established between enclosure 43 and the outer case of squib 15. The geometry of windings 50 on core 51 provides a greater flux density through core 44 of secondary windings 42 than does the asymmetrically disposed primary circuit of FIGURE 3. The utilization of magnetic flux in the device of FIGURE 4 is superior to that of the device of FIGURE 3 and the configuration is therefore preferred to the configuration of FIGURE 3.

Figure 5:
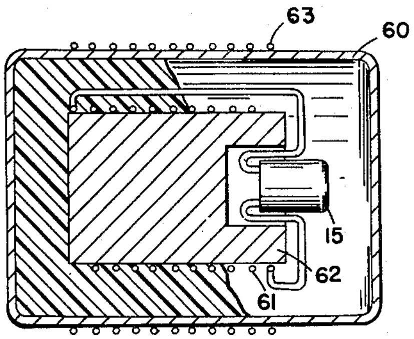
FIGURE 5 is a cross-sectional elevation of another embodiment of this invention wherein a unitary shield is shown.

In FIGURE 5 is shown another embodiment of the invention wherein the windings of the primary circuit and secondary circuit are co-axially wound in a torroidal-configuration. Core 55 is of circular configuration and comprises ferro-magnetic materials such as soft iron or the like, either laminated or non-laminated as may be desired. Secondary circuits windings 56 of insulated wire are helically wound on core 55 substantially entirely around the torroid. Conductive layer 57 is provided concentrically around core 55 and enclosing secondary circuit windings 56 to shield the secondary circuit winding from electro-magnetic radiation which would otherwise induce a voltage within secondary windings 56. Primary circuit windings 68 are helically wound concentrically upon layer 57 to provide a device similar in operation to the devices heretofore described. Secondary windings 56 may be operably connected to squib 15 in operable manner with the outer enclosure of squib 15 and conducting layer 57 being connected to provide a continuous electric current path through the squib enclosure and layer 57 in the device. The device shown in FIGURE 5 is of toroidal configuration but may be of substantially square or rectangular configuration or any other operable configuration which entirely shields the secondary circuit elements, including windings 56, squib 15 and at least one lead from the windings to the squib.

Figure 6:
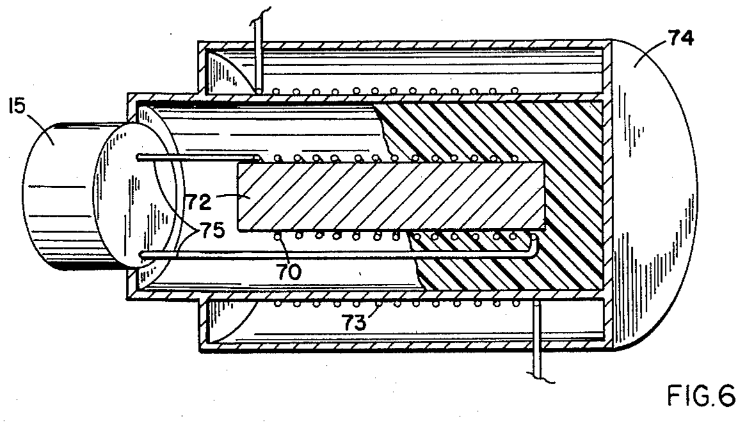
FIGURE 6 is a cross-sectional perspective view of another embodiment of this invention wherein a shielded primary winding is shown.

In FIGURE 6 is shown another embodiment of the invention wherein squib 15 is disposed interior to shield 60 together with secondary circuit winding 61, and core 62. The secondary circuit windings, squib device, and secondary circuit core are substantially similar to the device of FIGURE 1. Primary circuit windings 63 are provided in co-axial arrangement with secondary circuit windings 61 and external to shield 60 and wound thereon. In all cases wherein a primary circuit element or secondary circuit element is wound on a conducting member the windings are operably insulated to prevent current leakage from the circuit. It is apparent that the device of FIGURE 6 can only be used in those applications wherein a squib may be operably disposed apart from the charge to be ignited or when that charge may also be enclosed by shield 60. For this reason, the configuration shown in FIGURE 6 is not a preferred embodiment of this invention.

Figure 7:
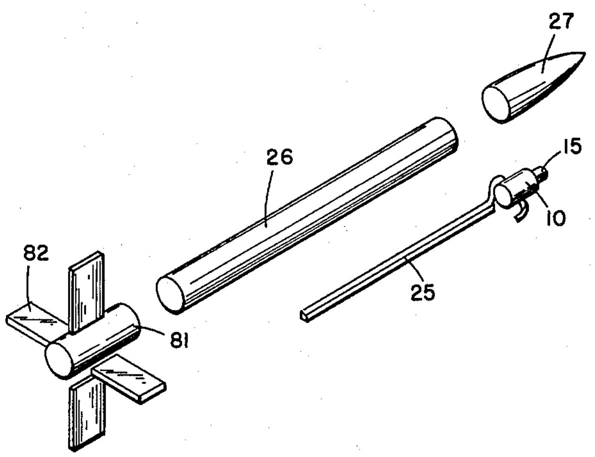
FIGURE 7 is an exploded perspective of a rocket provided with a device of this invention.
Figure 8:
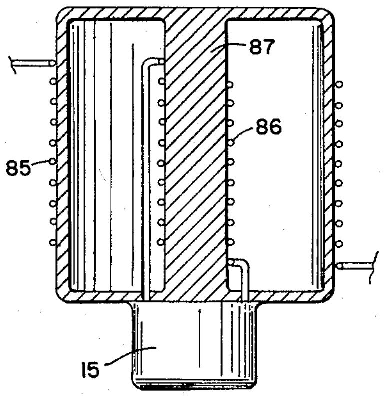
FIGURE 8 is a cross-sectional elevation of another embodiment of this invention wherein an integral core and shield member is shown.

In FIGURE 7 is shown another embodiment of this invention wherein double walled shield 74 is provided around secondary circuit winding 70 on core 72 and primary circuit winding 73 coaxially disposed thereabout in an annular space between walls of double-walled annular shield 74, as shown. Shield 74 protects the windings of both the primary and secondary circuits from environmental electro-magnetic radiation and thereby doubly protects the squib from spuriously induced currents. That portion of the shield which encloses the primary circuit winding has no effect on the energy transfer between circuits, and the design considerations are similar to those heretofore described; however, a lesser safety factor may be justified by providing a shielded primary circuit winding. A squib may be connected to windings 70 and shield 74 in the manner shown.

Figure 9:
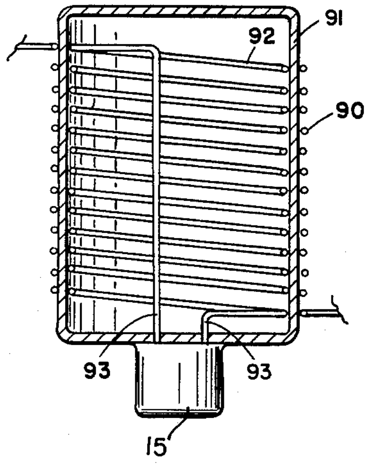
FIGURE 9 is a cross-sectional elevation of a device of this invention wherein a primary and secondary circuit winding of an inductor are disposed adjacent opposite surfaces of a shield member.

In FIGURE 9 is shown a 2.75 inch rocket in exploded view wherein projectile 27 comprises the foremost portion of the rocket, and tailpiece 81 comprises the rearmost portion of the rocket. Fins 82, tailpiece 81, provide flight-stabilizing means for the rocket. Body member 26 contains the propulsive charge for the rocket and is provided with resonance rod 25 in the fore-end of which device 10 and squib 15 of FIGURE 1 are operably disposed. Device 10 may be any other operable means heretofore described. Projectile 27 comprises a warhead in operable manner.

Figure 10:
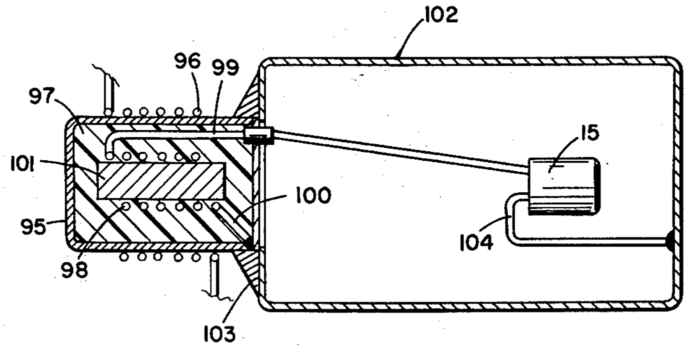
FIGURE 10 is a cross-sectional elevation of another embodiment of this invention wherein shield means comprises one electric connection between the secondary circuit and the squib.

In FIGURE 10 is shown another embodiment of the invention wherein primary circuit windings 85 are disposed co-axially with secondary circuit windings 86 and wherein core 87 is electrically conductive and is preferably ferromagnetic, for most efficient operation of the device as an inductor. Dielectric material such as synthetic resin or the like may be provided in the annular space within the member 87 if desired, but is not necessary.

Figure 11:
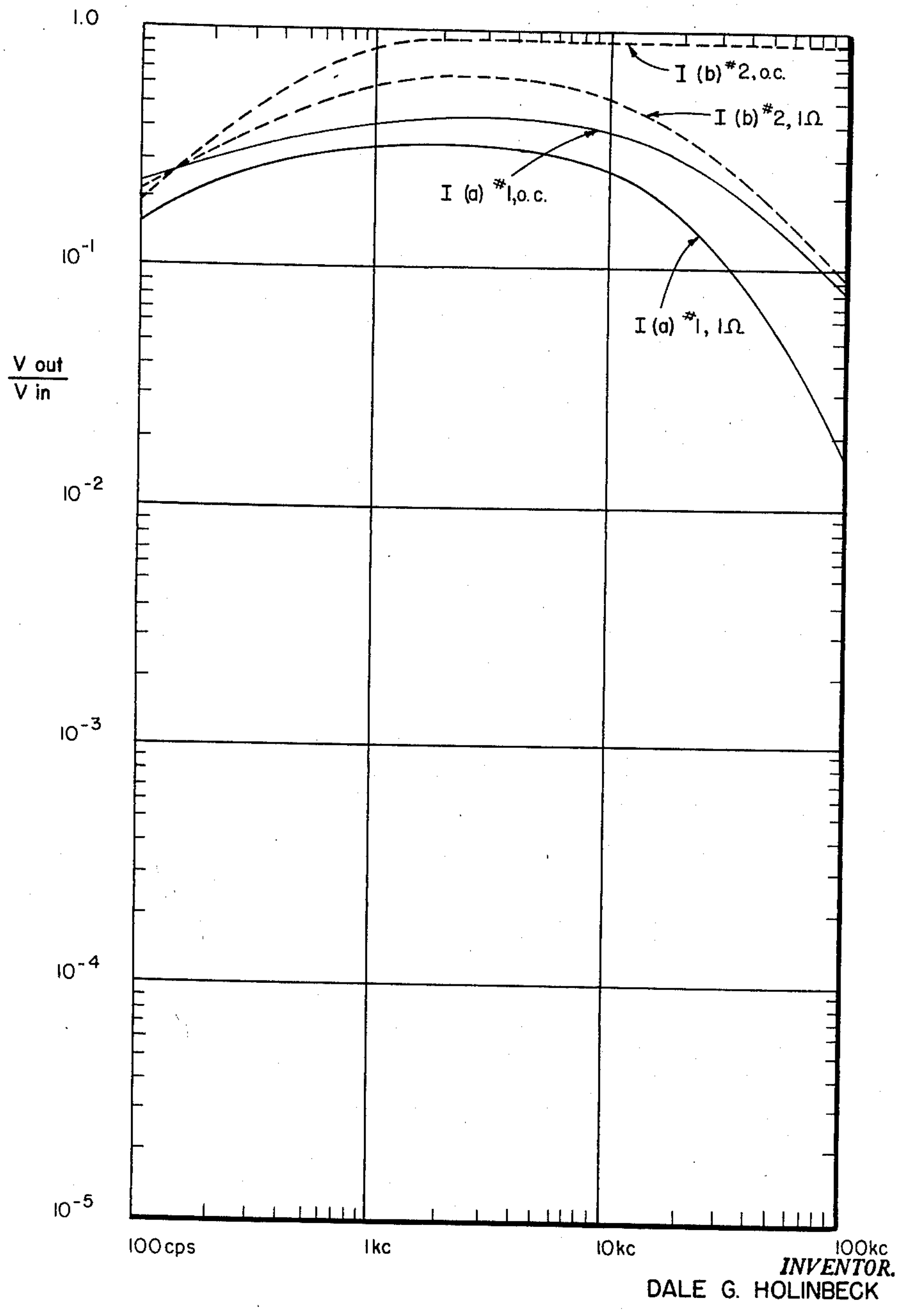
FIGURE 11 is a graph of operating data of one device of this invention in comparison with a device which is not in accordance with the invention.

In FIGURE 11 is shown another embodiment of this invention wherein primary circuit windings 90 are wound on the outside of conductive casing 91 and secondary circuit windings 92 are wound on the inside of casing 91. The secondary windings are operably connected to squib 15 by electric leads 93. A core is not provided for the secondary circuit in this embodiment of the invention and therefore the embodiment is not a preferred embodiment of the invention, inductive efficiency of the device being less than the embodiments wherein a ferromagnetic core is provided for the secondary circuit.

Figure 12:
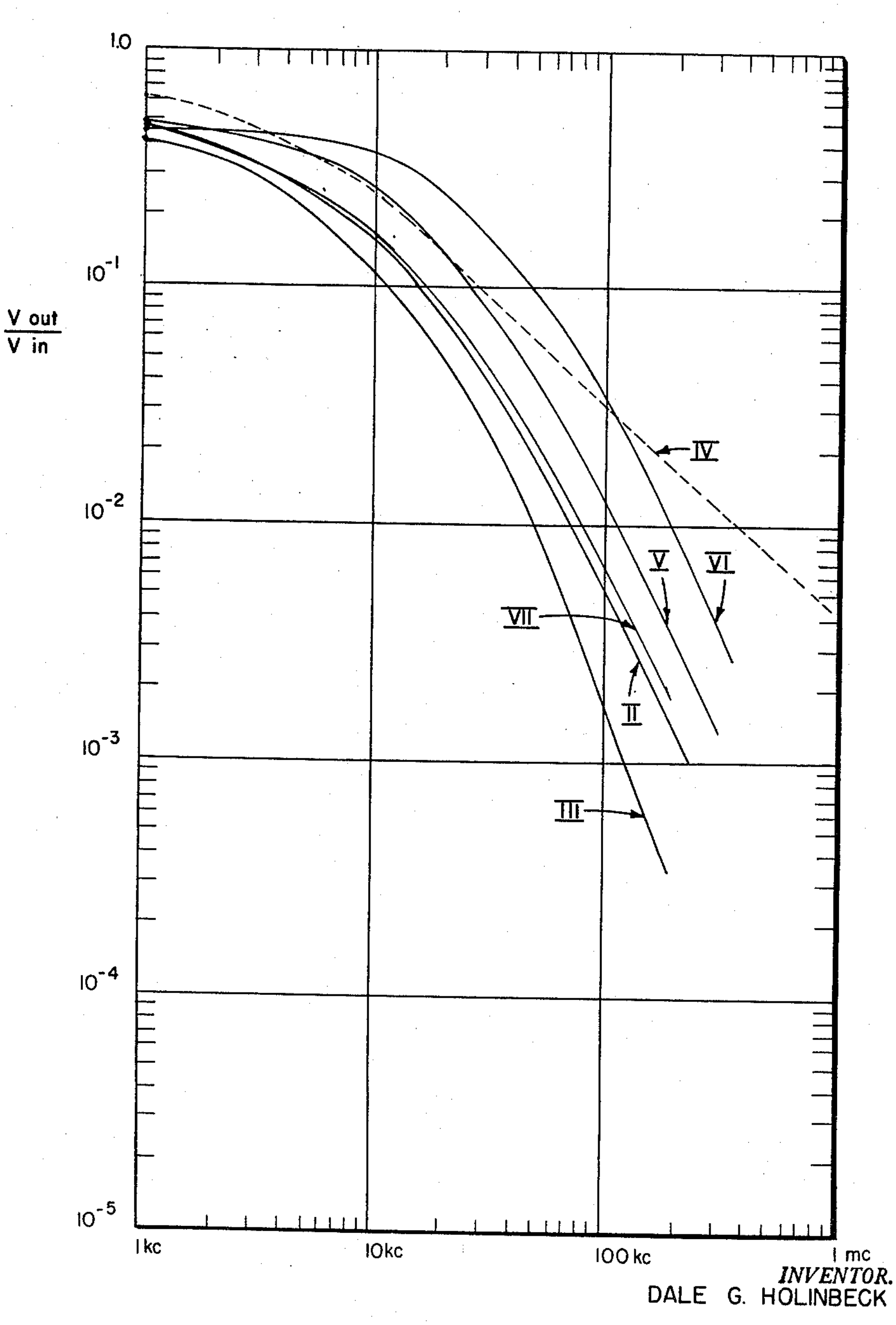
FIGURE 12 is a graph of operating data of devices of this invention wherein shield thickness, core diameter, and ratio of primary to secondary turns are changed.

In FIGURE 12 is shown another embodiment of the invention wherein shield 95 is provided with primary circuit windings 96 of insulated conductor wound thereon. Shield 95 is filled with di-electric material such as phenolic thermoset synthetic resin, polymethylmethacrylate, polyethylene or other operable material. Secondary circuit elements comprising secondary circuit winding 98, lead wire 99, lead wire 100, and core 101 are potted in material 97 in operable manner. Conductive container 102 is operably sealed to shield 95 by conductive resinous material 103. Material 103 may comprise a conventional synthetic resin which is admixed with metal particles or the like to be rendered conductive, such material being commercially available and comprising no part of this invention. Lead wire 100 is connected to the shielding enclosure comprising shield 95, container 102, and material 103. Lead wire 99 is insulated from the shielding enclosure and connects to squib 15 as shown. Lead wire 104 from squib 15 is connected to container 102 to provide a closed circuit through the container, material 103, and lead wire 100 to secondary winding 98.

The following examples illustrate the applicability of this invention to a conventional type of squib for military armaments. As used herein "squib" means the sealed, unitized explosive charge, bridge wire and posts or connectable lead wires therefor and does not include windings.

*Example I*

Device I(*a*) was constructed as shown in FIGURE 1 above. A squib of a type usable with the device has the following operating characteristics:

Resistance of squib circuit: 0.7–1.3 ohms
Squib circuit test current: <10 ma.
100% inoperable firing current: 0.2 amp.
100% effective firing current: 0.3 amp.
Recommended firing current: 1.5 amp.
Electro-static sensitivity: 52,000 ergs from a 400 mmfd. condenser
Bridge wire: 0.001 inch platinum-iridium alloy wire
Lead wire lengths: Vary between 1¼ inches and 20½ inches, according to model
Weight: 1.25 grams to 5.25 grams, depending on lead wire length.

Enclosure 21 comprised 0.014 inch thick copper sheet configured as a cylinder with a 0.5 inch outside diameter. Primary winding 22 comprised one layer of No. 24 enamelled copper wire close wound for 1.5 inches axial length. Secondary winding 12 comprised wires having the same number of turns as the primary winding and wound on a 0.38 inch diameter cold drawn iron core.

Device I(*b*) comprised a device similar to device I(*a*), but wherein cardboard was substituted for copper in shield 21.

Figure 13:
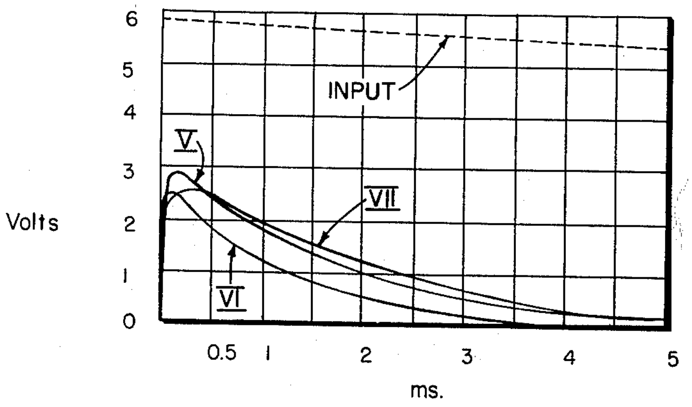
FIGURE 13 is a graph of voltage magnitude of a direct current pulse in a device of this invention.

To standardize experimental procedure, a calibrated one-ohm load was substituted for the squib in all tests. Open circuit and closed circuit tests were performed. The results of the tests are graphed in FIGURE 13 wherein the ratio of the secondary circuit voltage (Vout) to the primary circuit voltage (Vin) is plotted against the frequency of the charging current in the primary circuit. The curves marked O.C. depict open circuit tests and the curves marked 1Ω depict closed circuit tests. Closed line curves show results obtained with device I(*b*).

It will be observed that at frequencies of 10 kc. and greater the voltage induced in the secondary circuit of device I(*a*) is attenuated with respect to the voltage in the primary circuit thereof more strongly than in device I(*b*).

*Example II*

A device substantially as shown in FIGURE 1 comprising one layer of closely spaced windings of No. 24 enamelled copper wire having a diameter of 0.021 inch for approximately 1.50 inches axial length was provided. The dimensions of shield 21 were 0.50 inch outside diameter and 0.470 inch inside diameter with a 0.015 inch thick copper wall. The shield was configured with one closed end and one closable end. The secondary winding comprised six concentric layers in series of No. 24 enamelled copper wire wound on a cold drawn iron core of 0.185 inch diameter for an axial length of 1.25 inches. Each layer comprised the same number of turns as primary windings.

*Example III*

Primary circuit: same as Example II.
Secondary circuit: same as Example II.
Shield: copper of 0.50 inch outside diameter and 0.44 inch inside diameter; wall thickness of 0.03 inch.

*Example IV*

Primary circuit: same as Example II.
Secondary circuit: same as Example II.
Shield substitute: polymethylmethacrylate of 0.50 inch outside diameter and .030 inch wall thickness.

*Example V*

Primary circuit: same as Example II.
Secondary circuit: same as Example II except four layers in series of wire were provided on a core of 0.295 inch diameter.
Shield: same as Example II.

*Example VI*

Primary circuit: same as Example II.
Secondary circuit: same as Example II except two layers in series of wire were provided on a core of 0.380 inch diameter.
Shield: same as Example II.

*Example VII*

Primary circuit: same as Example II.
Secondary circuit: same as Example II, except 0.215 inch diameter core was provided.
Shield: same as Example II.

Figure 14:
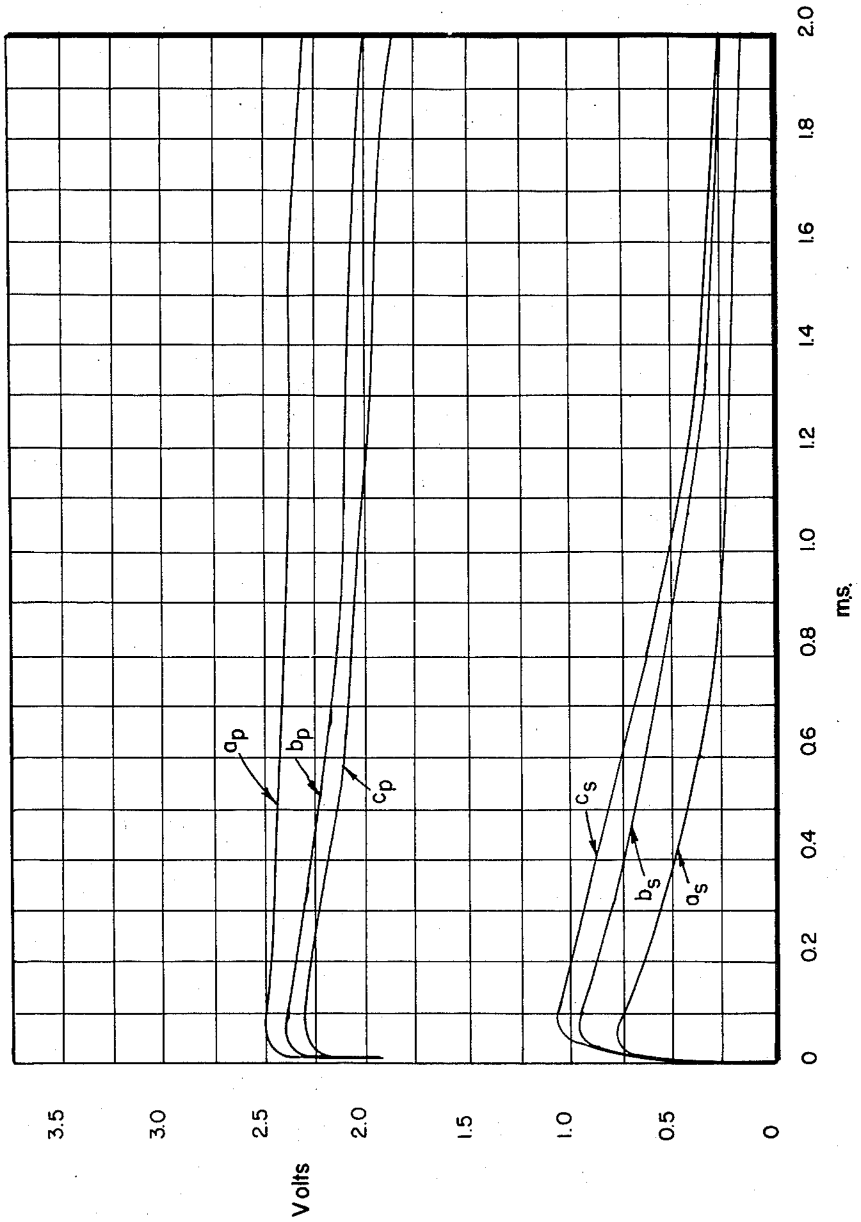
FIGURE 14 is a graph of secondary circuit voltage when multiple layers of parallelly connected primary circuit windings are provided.

The results of tests with the devices of Examples II–VII when provided with one-ohm loads in the secondary circuit are shown in FIGURE 14. The ratio of voltage in the secondary circuit (Vout) to voltage in the primary circuit (Vin) is plotted versus frequency of the current in the primary circuit.

Figure 15:
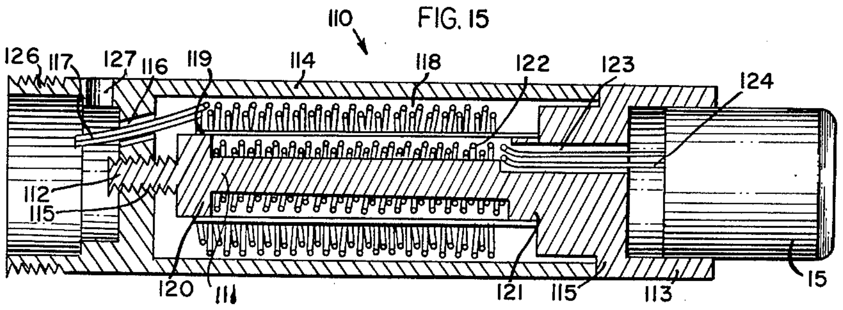
FIGURE 15 is a cross-sectional elevation of another embodiment of a device of this invention.

A difference in the number of layers of windings connected in series in the secondary circuit, as shown in the curves for the devices of Examples II, V, and VI in FIGURE 14, wherein 6, 4, and 2 layers, respectively, of series connected windings are provided, produces the results shown. The voltage-time response of the secondary circuit for 6-volt direct current in the primary circuit is shown in FIGURE 15 for the devices of Examples VII, V, and VI. The number of layers of windings is relatively non-critical to the invention herein set forth.

The ratio of voltage in the secondary circuit to voltage in the primary circuit is materially affected by the shield thickness and is decreased in proportion to the increase in the thickness of a shield, as shown in the curves for the devices of Examples II, III, and IV. The shield thickness is therefore a material factor in the selection of a device for use in a particular application. As shown by the curve in FIGURE 14, for Example IV, a non-conducting material in place of the metal shield does not materially influence the pick-up of current in the squib and is not operable herein because adequate certainty of attenuation is not provided.

The effect produced by changing the diameter of the core on which the secondary winding is wound is shown in FIGURE 14 for the curves of Examples II and VII to be relatively minor, although not negligible.

All of the devices described and illustrated provide substantially similar characteristic response to change in high-frequency radiation.

*Example VIII*

Figure 16:
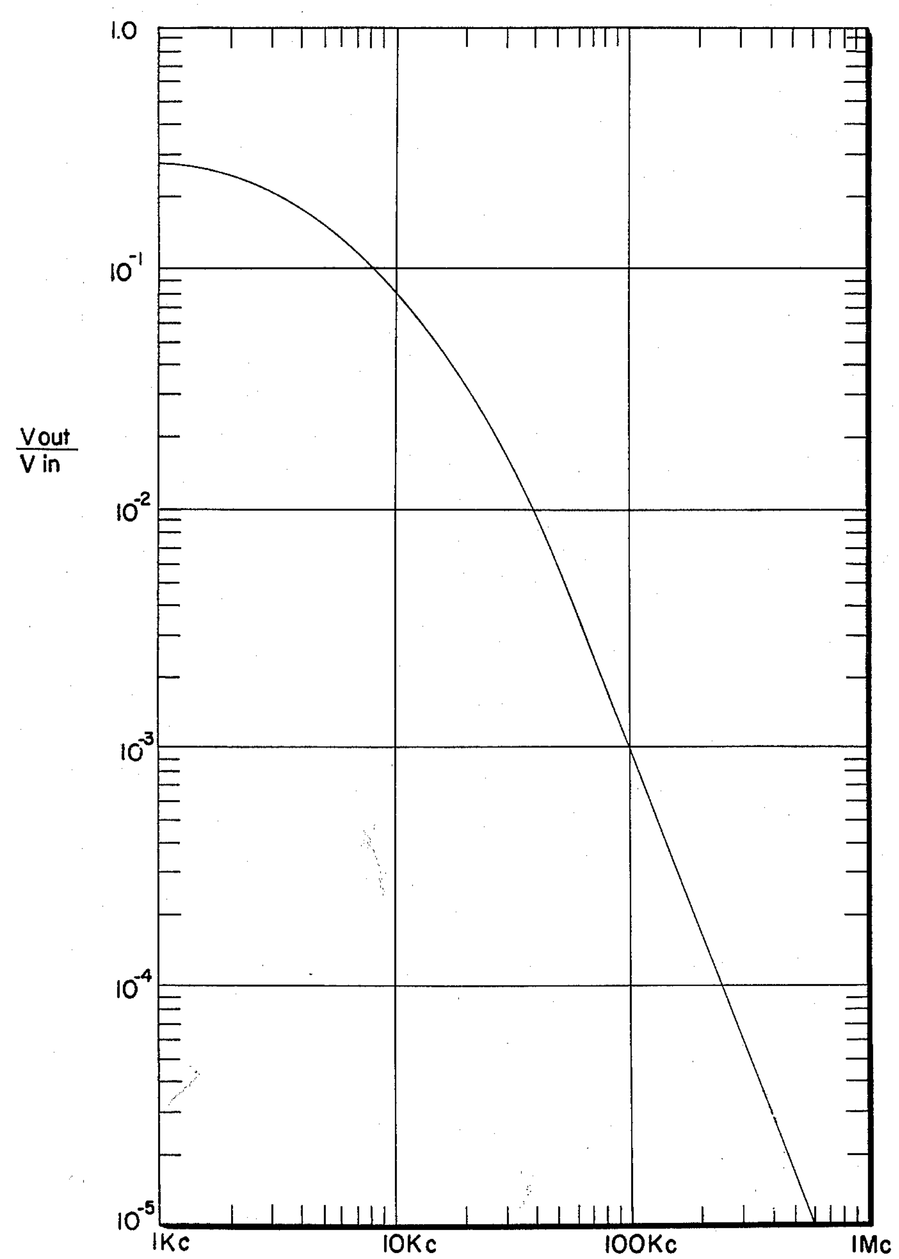
FIGURE 16 is a graph of the ratio of secondary circuit output voltage across a 1 ohm resistive load to primary circuit input voltage as a function of the frequency of the input voltage for the device of FIGURE 17 of this invention.

The device I(*a*) of Example I was provided in separate tests with 1, 2, and 3 layers of parallel connected primary circuit windings. The secondary circuit was provided with a one-ohm lead. A 6-volt battery was connected to the primary circuit by means of a mercury switch. The pulses produced by flow of direct current in the 1, 2, and 3 parallel connected primary circuit layers are shown by curves $a_p$, $a_s$, $b_p$, $b_s$, $c_p$, $c_s$, of FIGURE 16, wherein *a*, *b*, *c* relate to 1, 2, and 3 layers, respectively of primary windings and subscripts *p* and *s* relate to primary and secondary circuits respectively.

Figure 17:
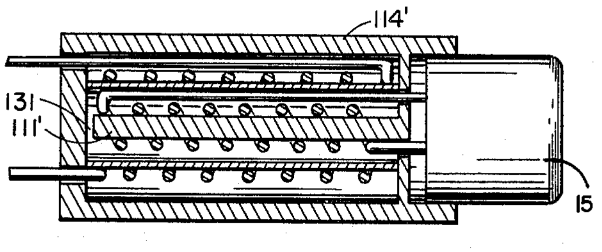
FIGURE 17 is a cross-sectional elevation of another embodiment of a device of this invention.

In FIGURE 17 is shown another device of the invention embodying a preferred construction. Squib protector 110 comprises a core 111 of magnetic material, either laminated or preferably solid, provided with threaded portion 112 at one end extremity thereof and with open cylindrical end 113 at the other end extremity thereof. Magnetic material 114, either laminated or preferably solid, is provided with threaded opening 115 for receiving threaded portion 112 of core 111. The open cylindrical end of magnetic material 114 near portion 115 of core 111 is press fitted onto a shoulder of core 111 as shown. Magnetic material 114 is provided with opening 116 for passing leads 117 from primary winding 118 through wall of magnetic material 114 to the squib firing circuit. Primary winding 118 is wound on electrically conductive, either magnetic or non-magnetic, cylindrical shield member 119 comprising preferably copper, stainless steel or soft iron tube or composite layers of these or other suitable electrically conductive materials. Member 119 is press-fitted or preferably soldered onto shoulders 120 and 121 of core 111 and, together with shoulders 120, 121, core 111, cylindrical end 113 and, in this case, metal-cased squib 125 comprises a completely electromagnetically shielded region in which is wound secondary winding 122. Secondary winding 122 is wound on core 111 and is disposed within the annular space between shield member 119 and core 111. Opening 123 is provided through core 111 for lead wires 124 from secondary winding 122 to squib 15.

If metal cased squib 15 is remotely positioned with respect to device 110, it is desirable to completely shield interconnecting extensions of leads 124 with an electrically conductive sheath that at one extremity has an open end configuration into which metal-cased squib 15 is soldered or press-fitted and at the other extremity is soldered, press-fitted or otherwise suitably attached to open cylindrical end 113. If device 110 is used to protect an ignitor or the like which does not have a metallic case, it is desirable as shown generally in FIGURE 12 to completely shield the device with a suitable metal enclosure that is soldered or press-fitted onto open cylindrical end 113.

Squib 15 is electrically wired to device 110 by operable connection of leads 124 thereto, and is mounted by being soldered or press fitted into open end structure 113 of core 111. The opposite end extremity 126 of device

110 is threaded for operable attachment to a mating electrical connector. Any other desirable fittings may be provided.

Figure 18:
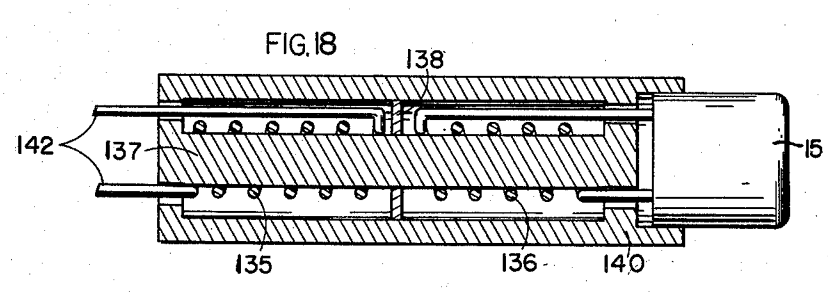
FIGURE 18 is a cross-sectional elevation of another embodiment of a device of this invention.

The effectiveness of the device of FIGURE 17 in suppressing high frequency currents in the circuit of a squib is shown in FIGURE 18 wherein the ratio of secondary circuit output voltage across a 1-ohm resistive load to primary circuit input voltage is plotted against the frequency of the input voltage. The following example illustrates the construction of the device of FIGURE 17 having the performance characteristics shown in FIGURE 18.

*Example IX*

A device as shown in FIGURE 17 for use with a squib of Example I was constructed having an overall length of 3⁷⁄₁₆ inches and coil lengths of 1¼ inches. The primary coil was wound on a tellurium copper tube having an outer diameter of 0.437 inch and a wall thickness of 0.02 inch. The secondary coil was wound on a 0.250 inch diameter core of grade C silicon iron. The primary winding comprised two double layers of No. 30 heavy "Form var" (a trademark) coated copper wire close wound and connected in parallel. The secondary winding comprised three double layers of No. 32 heavy "Form var" (a trademark) coated copper wire close wound and connected in parallel. Openings 116 and 123 (FIGURE 17) comprised ³⁄₃₂ inch drill holes with opening 127 comprising a No. 31 drill hole countersunk with a No. 26 drill. A screw through the latter opening secured the electrical connector insert (not shown) in cylindrical end 126. Primary leads 117 passed through opening 116, through a switch to a 6-volt battery source. Secondary leads 124 passed through opening 123 and were connected to a 1-ohm load substituted for squib 15 for test purposes. The results of circuit tests with a 1-ohm resistive load are shown in FIGURE 18.

The provision of a device with a closed magnetic path through iron as shown in the device of FIGURE 17 compares with a similar device (*x*) constructed without magnetic material 114 as illustrated in the following tabulation. In the device (*x*) the construction is similar to that of Example IX except that shield member 119 was a 0.015 inch wall copper tube and primary coil winding was a single layer of No. 22 enamelled copper wire close wound on 0.015 inch wall copper tube (member 119) and secondary coil windings were 6 layers of No. 24 enamelled copper wire close wound on 0.180 inch diameter cold rolled iron core (111).

| | Example IX device* | Device (*x*)* |
|---|---|---|
| Input voltage | 5.8 volts D.C. | 4.5 volts D.C. |
| Input current | 2.3 amps. | 29.8 amps. |
| Output voltage | 1.02 volts across 1.05-ohms. | 2.65 volts across 1.0-ohm load. |

*All values averaged over first millisecond.

$$\frac{\text{Approximate power in}}{\text{Approximate power out}}\ \frac{5.8\times 2.3}{(1.02)^2/1.05}=$$

$$13.4\ \frac{4.5\times 29.8}{(2.65)^2/1.0}=19.1$$

A distinguishing performance feature of the device of FIGURE 17 is that by employing a magnetic circuit closed through ferromagnetic material rather than through nonferromagnetic material, the magnetic reluctance of the circuit is reduced in the device and a larger percentage of the input power for intentional firing of the squib is delivered to the squib while at the same time, as is apparent from FIGURE 18, attenuation of high frequency voltage is pronounced. Furthermore, current input requirements are drastically reduced in the Example IX device as compared to device (*x*). The construction shown in FIGURE 17 is preferred embodiment of the invention.

*Example X*

A device similar to the device of Example IX is provided with the exception that member 119 is 0.015 inch wall thickness 18% nickel 8% chromium stainless steel tube and a No. 5B flash bulb comprising combustible metal wire in a closed oxygen rich atmosphere is substituted for the 1-ohm standardized resistor of Example X. The bulb is enclosed in a wire screen which is grounded to the casing by a retainer ring. The bulb ignites when a 5.8 volt D.C. source is impressed on the primary circuit. The performance of the device is similar to that of the device of Example IX.

The utility of the device of this invention in preventing accidental electrical actuation is achieved by totally enclosing the secondary coil and electrically heated filamentary member and electrical conductors which connect these elements of such devices by an electromagnetic shield of adequate thickness to isolate these elements from ambient radiation and by providing solely magnetic coupling for actuating the device. It is necessary for providing optimum protection that a completely electromagnetically shielded circuit be provided, and that a penetration in the shield not exist through which a conductor is passed.

In FIGURE 19 is shown another embodiment of the invention similar to the FIGURES 4 and 17 in some respects. An airgap 131 is provided between the end of core 111' and one end of casing 114'. The provision of a non-magnetic gap such as in a magnetic path is known as a method for improving the operating characteristics of magnetic circuits and may be desirable in the device of this invention for providing optimum operating characteristics.

The device of this invention may be an expendable component of a circuit or may be a reusable component of a circuit. If desired, a squib or igniter may be remotely located from a magnetically coupled circuit element of this invention. In such case it is necessary to provide intimate contact between shielding on the electrical leads extending between the squib or igniter and the magnetically coupled protective element such as by soldering the shielding to the casing of the protective element or by press fitting the casing onto the shielding. The shielding and casings which enclose the squib or igniter and the magnetically coupled circuit element must be a conductive material, and may be a ferro-magnetic material.

*Example XI*

A device similar to that shown in FIGURE 17 and described in Example IX is provided in combination with a 14 gauge sheet metal building. The building is completely enclosed with metal doors, floor, walls and roof, and is devoid of wires, pipes or other elongated objects which pass transversely through the sheet metal. The device similar to that of FIGURE 17 is mounted on the exterior of the building with sealed conductive contact being established therewith by soldering or by an equivalent manner of sealing the casing of the device to the building. The secondary circuit leads are connected to instruments requiring complete high frequency protection within the building. The interior of the building is substantially insulated from high frequency environmental radiation and the instruments within the building are unaffected by external influences.

In FIGURE 20 is shown another embodiment of the invention wherein primary and secondary windings are axially disposed on a solid iron core. Primary winding 135 and secondary winding 136 are each wound on core 137 with electromagnetic shield 138 disposed therebetween. Shield 138 is soldered or otherwise conductively secured at all portions of all its peripheral edges to portions of casing 140 and core 137. Casing 140 and shield 138 comprise conductive material, either magnetic or non-magnetic, such as copper, steel or the like, casing 140 being preferably of magnetic material and shield 138 being generally of non-magnetic material. The metal container of squib 15 is soldered or otherwise sealed to casing 140 so that there is provided an impervious metal shield around the secondary circuit. At least one pulse of current is impressed on primary winding 135 by means of leads 142 to provide flux change in core 137. Core 137 may be laminated to such extent as does not defeat previously described limitations and requirements. The device of FIGURE 20 functions in a manner similar to the devices above described.

A completely shielded enclosure, such as described in Example XI, uncompromised by conductors passing through the shield, will provide inherent protection from lightning striking the shield. To help protect against accidental firing in a squib circuit or the like by lightning discharge to the primary leads outside the device, a suitable spark gap or gaps may be incorporated into the primary circuit of this device. The gap is set to break down at a prescribed voltage to give such added protection by providing a current shunt across the primary winding.

Protection against lightning is feasible with this device because of its selective insensitivity to being fired by capacitor discharge methods which are similar to lightning discharge phenomena. This insensitivity derives from the poor energy transfer resulting from the very short time duration of the lightning discharge. Because of the extreme difference in voltage required to fire the device by capacitor discharge comparable to a lightning discharge as compared to the usual battery or A.C. firing methods, a gap setting which permits normal firing while simultaneously assisting in protecting against lightning discharge is attainable.

It is possible to fire the device by capacitor discharge methods.

While certain modifications and embodiments of the invention have been described, it is of course to be understood that there are a great number of variations which will suggest themselves to anyone familiar with the subject matter thereof, and it is to be distinctly understood that this invention should not be limited except by such limitations as are clearly imposed in the appended claims.

I claim:

1. Means to initiate a rapid self-sustaining chemical reaction comprising, in combination with a member which is heated by passing electric current through the member and reactant substances adjacent said member:

a substantially cylindrical housing of magnetic material, an electro-explosive device comprising said member, said device also comprising a metal container which entirely encloses the other portions of said device except for having a single opening in said container, said cylindrical housing having a first opening at a first end and a second opening at a second end, said metal container of said device joined by conductive means to the first end of said cylindrical housing in unapertured conductive sealing engagement to provide communication between the said opening in said metal container of said device and the first opening at the first end of said cylindrical housing, a core of magnetic material extending axially in said cylindrical housing and having each of its ends in at least close proximity to the magnetic material of said housing, a secondary coil wound on said core and having electrical conductors extending from the ends of said coil to said member, a metal electromagnetic shield joined at all of its peripheral edges in unapertured conductive sealing engagement to portions of said core and housing to substantially entirely electrically isolate from ambient radiation said secondary coil and said conductors and said member, a primary coil within said housing provided with said core extending substantially axially through its center and electrical conductors extending from the ends of said coil through the second opening in said second end of said cylindrical housing.

2. The means of claim 1 wherein said shield is a cylindrical member interposed between said primary coil and said secondary coil and said primary coil extends around said secondary coil.

3. The means of claim 1 wherein said shield is an annular member and said primary and secondary coils are longitudinally spaced apart on said core.

4. The means of claim 1 wherein said core is joined to said housing at each of its ends with magnetic material.

References Cited by the Examiner

UNITED STATES PATENTS

| | | | |
|---|---|---|---|
| 1,689,929 | 10/28 | Osborne | 336—84 |
| 2,459,854 | 1/49 | Swift. | |
| 2,640,417 | 6/53 | Bjork et al. | 102—49 |
| 2,724,108 | 11/55 | Hayes et al. | 336—84 |
| 2,904,762 | 9/59 | Schulz | 336—84 |
| 2,905,915 | 9/59 | Harris | 336—84 |
| 2,918,001 | 12/59 | Alford | 102—28 |
| 3,038,384 | 6/62 | Gaugler | 60—39.82 |
| 3,043,223 | 7/62 | Clark | 102—70.2 |

SAMUEL FEINBERG, *Primary Examiner.*